United States Patent
Kotani

(10) Patent No.: US 6,324,157 B1
(45) Date of Patent: *Nov. 27, 2001

(54) INFORMATION RECORDING MEDIUM CAPABLE OF BEING TESTED FOR AUTHENTICITY

(75) Inventor: Seigo Kotani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/039,611

(22) Filed: Mar. 16, 1998

(30) Foreign Application Priority Data

Sep. 18, 1997 (JP) .................................................. 9-253918

(51) Int. Cl.$^7$ ....................................................... G11B 7/24
(52) U.S. Cl. ............................................................ 369/275.3
(58) Field of Search ................................... 369/275.3, 58, 369/53.11

(56) References Cited

U.S. PATENT DOCUMENTS

| | | | |
|---|---|---|---|
| 3,439,344 | * 4/1969 | Stanga | 360/48 X |
| 4,094,013 | * 6/1978 | Hill et al. | 369/275.3 X |
| 4,734,901 | * 3/1988 | Murakami | 369/59 |
| 4,896,240 | * 1/1990 | Moriya et al. | 360/78.08 X |
| 5,173,886 | * 12/1992 | Satoh et al. | 369/275.3 X |
| 5,218,590 | * 6/1993 | Miyasaka | 369/54 |
| 5,388,090 | * 2/1995 | Hoshino et al. | 369/275.3 |
| 5,400,309 | * 3/1995 | Satomura | 369/32 |
| 5,604,727 | * 2/1997 | Ishihara | 369/275.3 |
| 5,627,695 | * 5/1997 | Prins et al. | 360/77.08 X |
| 5,703,867 | * 12/1997 | Miyauchi et al. | 369/275.3 |
| 5,812,501 | * 9/1998 | Moribe et al. | 369/58 X |
| 5,848,438 | * 12/1998 | Nemazie et al. | 369/275.3 X |
| 5,886,979 | * 3/1999 | Moribe et al. | 369/275.3 |

FOREIGN PATENT DOCUMENTS

0800172 * 10/1997 (EP) .

OTHER PUBLICATIONS

Abstract of JP 5–257816, Oct. 8, 1993.*
Abstract of JP 9–073680, Mar. 18, 1997.*
Abstract of JP 8–278466, Oct. 1996.*

* cited by examiner

Primary Examiner—Aristotelis M. Psitos
(74) Attorney, Agent, or Firm—Greer, Burns & Crain, Ltd.

(57) ABSTRACT

The recording/reproducing apparatus of the invention can discriminate an illegally copied information recording medium by reading an irreversible area from the information recording medium on the basis of judgement on presence of irreversible data. The information recording medium of the invention includes a buffer area which is not affected by heat used in recording the irreversible data, and the judgement is obtained with the buffer area excluded. Therefore, a mistake in judging whether or not the irreversible data is recorded in the loaded information recording medium can be avoided.

3 Claims, 8 Drawing Sheets

INFORMATION RECORDING MEDIUM CAPABLE OF BEING TESTED FOR AUTHENTICITY

BACKGROUND OF THE INVENTION

The present invention relates to a medium in the shape of a disk, a tape or a card, such as an information recording medium where identification data is irreversibly recorded, and also to a recording/reproducing apparatus for reading the identification data from the information recording medium.

A magneto-optical disk can store a large volume of information with a portable size, and application of such a magneto-optical disk has been examined as a core recording medium in the rapidly developing multi-media. Since mass information can be recorded in a magneto-optical disk, management of information recorded therein, for example, prevention of illegal usage of the information has become very significant.

The present applicant has proposed a method of protecting information by using a medium identification code peculiar to each optical disk in Japanese Patent Application Laid-Open No. 5-257816 (1993). In this publication, however, a method of forming the medium identification code is not described, and the illegal usage of information cannot be actually prevented.

In order to definitely prevent the illegal usage of information, the present applicant has described a method of forming the medium identification code in Japanese Patent Application Laid-Open No. 9-73680 (1997). In this method, a medium identification code with a predetermined number of bits is irreversibly, namely, unrewritably recorded in a magneto-optical disk. An erasing operation is conducted on an area where the medium identification code is recorded, so as to judge whether or not a magneto-optical disk in use is a genuine product. When the medium identification code is not erased, the magneto-optical disk is genuine, and when it is erased, the magneto-optical disk is a copied product, and hence, information recorded therein is prohibited to be used.

The illegal usage of information can be thus prevented. However, a reproduced signal obtained from the irreversibly recorded medium identification code has such a small signal amplitude that there can be a case where the signal cannot be identified as the medium identification signal. As a countermeasure, the present applicant has described, in Japanese Patent Application No. 8-278466 (1996), an information recording medium where identification data is recorded by using an arrangement of irreversibly recorded unit areas and non-irreversibly recorded unit areas. In reading the identification data from this information recording medium, binary data is not read by using a difference of a signal amplitude but it is judged whether or not a read area is an irreversibly recorded area.

In reading such identification data, when a reproduced signal obtained from an irreversibly recorded area has a value approximate to a threshold value of binary data, an error in binarization can disadvantageously lead to a mistake in the judgement of the area.

BRIEF SUMMARY OF THE INVENTION

The present invention was devised to overcome the aforementioned problems. One object of the invention is providing a recording/reproducing apparatus which can read irreversible data from an information recording medium where the irreversible data is recorded, providing a recording/reproducing apparatus which can avoid a mistake in judging whether or not a unit area is an irreversibly recorded area, and providing an information recording medium from which irreversible data can be rapidly read by changing a frequency of error correction.

Another object of the invention is providing an information recording medium in which judgement of a unit area can be prevented from being affected by heat used in an irreversible recording operation by providing a buffer area not concerning irreversible data between an irreversibly recorded unit area and a following unit area.

Still another object of the invention is providing an information recording medium from which irreversible data can be accurately read by additionally recording error correction code data for the irreversible data therein.

The recording/reproducing apparatus of this invention comprises storage means for storing a predetermined code; recording means for recording the predetermined code in a predetermined area of the information recording medium; reproducing means for reproducing the predetermined code having been recorded in the predetermined area as a reproduced code; comparing means for comparing the predetermined code and the reproduced code; judging means for judging, as a result of comparison, the predetermined area to be an irreversible area when the predetermined code and the reproduced code do not accord with each other and to be a reversible area when the predetermined code and the reproduced code accord with each other; and reading means for receiving a result of judgement and reading the irreversible data.

Accordingly, it is possible to determine whether or not the predetermined code has been normally recorded by comparing the recorded predetermined code with the reproduced code obtained by reproducing the predetermined code by the comparing means. Since the predetermined code cannot be normally recorded in an irreversible area, the predetermined code does not accord with the reproduced code, namely, the area where the predetermined code is not normally recorded can be judged to be an irreversible area.

Alternatively, the recording/reproducing apparatus of this invention comprises storage means for storing a predetermined code; recording means for recording the predetermined code and error correction code data in a predetermined area of the information recording medium; reproducing means for reproducing the predetermined code and the error correction code data having been recorded in the predetermined area; error correcting means for conducting error correction by using the predetermined code and the error correction code data having been reproduced; judging means for judging the predetermined area to be an irreversible area when the error correction is abnormally completed and to be a reversible area when the error correction is normally completed; and reading means for receiving a result of judgement and reading the irreversible data.

Accordingly, the error correcting means determines whether or not the reproduced code includes an error and whether or not the error of the reproduced code can be corrected by using the error correction code data. Since the predetermined code cannot be normally recorded in an irreversible area, when the reproduced predetermined code cannot be corrected by using the error correction code data, namely, when the error correction is abnormally completed, the predetermined area can be judged to be an irreversible area.

Furthermore, the recording/reproducing apparatus can further comprises instructing means for instructing a subsequent predetermined area after the judgement of the predetermined area, and the reading means reads the irreversible data after the judgement of all predetermined areas on the basis of an arrangement of the predetermined areas.

Accordingly, the plural predetermined areas are successively reproduced, so that the respective areas can be judged to be an irreversible area or a reversible area. The reading means reads the irreversible data on the basis of the arrangement of the predetermined areas after receiving the results of the judgement.

In one aspect of the recording/reproducing apparatus, the instructing means specifies, when the predetermined area is judged to be an irreversible area by the judging means, a subsequent predetermined area excluding a buffer area, which is disposed between the irreversible area and a following unit area and do not concern the irreversible data.

Accordingly, the instructing means specifies reproduction of a subsequent predetermined area with the buffer area excluded. The buffer area is disposed on the back side along the track of each irreversible area, and can easily affect the judgement of an irreversible area due to heat used in the irreversible recording operation. The buffer area does not concern the irreversible data and is not specified to be reproduced by the instructing means. Thus, a mistake in the judgement of an irreversible area can be avoided.

In another aspect of the recording/reproducing apparatus, the error correcting means includes frequency setting means for changing a frequency of the error correction between a case where the predetermined area is to be read and a case where another area is to be read.

Accordingly, the set frequency for the error correction can be varied between the case where the irreversible data is to be reproduced and the case where another date is to be reproduced. In reproducing the irreversible data, the reproduced area is judged to be irreversible when the error correction is not normally completed, and hence, there is no need to repeat the error correction may times in every abnormal completion. Therefore, in reproducing the irreversible data, the error correction is repeated by a smaller frequency than in the normal reproducing operation, namely, 0 times, once or twice. Thus, the irreversible data can be rapidly read.

In still another aspect of the recording/reproducing apparatus, the predetermined code includes at least both binary values.

Therefore, binary data used as the predetermined code is generated so as to include at least both binary values. For example, in the case where all the bits of the predetermined code are '0' or '1', the reproduced code can accidentally accords with the predetermined code even though the specified area is an irreversible area if obtained data of the reproduced code approximates to a threshold value in binarization. Therefore, when at least one '1' and one '1' are used, more preferably when '0' and '1' are used in equal number in the predetermined code, the accidental coincidence can be avoided, so that the irreversible data can be accurately read.

The information recording medium of this invention comprises a buffer area which is formed between the irreversibly recorded unit area and a following unit area and does not concern the irreversible data.

Accordingly, the buffer area is provided in the backward portion along the track of an irreversibly recorded unit area, and the buffer area, which does not concern irreversible data, is not used in the judgement of an irreversible area. Therefore, heat used in the irreversible recording operation can be avoided from causing a mistake in the judgement.

Alternatively, in the information recording medium of this invention, error correction code data corresponding to the irreversible data is recorded.

Accordingly, the error correction is conducted by using the error correction code data and the irreversible data, which is read on the basis of an arrangement of an irreversibly recorded unit area and a non-irreversibly recorded unit area. Therefore, the irreversibly data can be accurately read.

The above and further objects and features of the invention will more fully be apparent from the following detailed description with accompanying drawings.

DETAILED DESCRIPTION OF THE INVENTION

The present invention will now be described with reference to the accompanying drawings illustrating preferred embodiments thereof.

Embodiment 1

Figure 1:
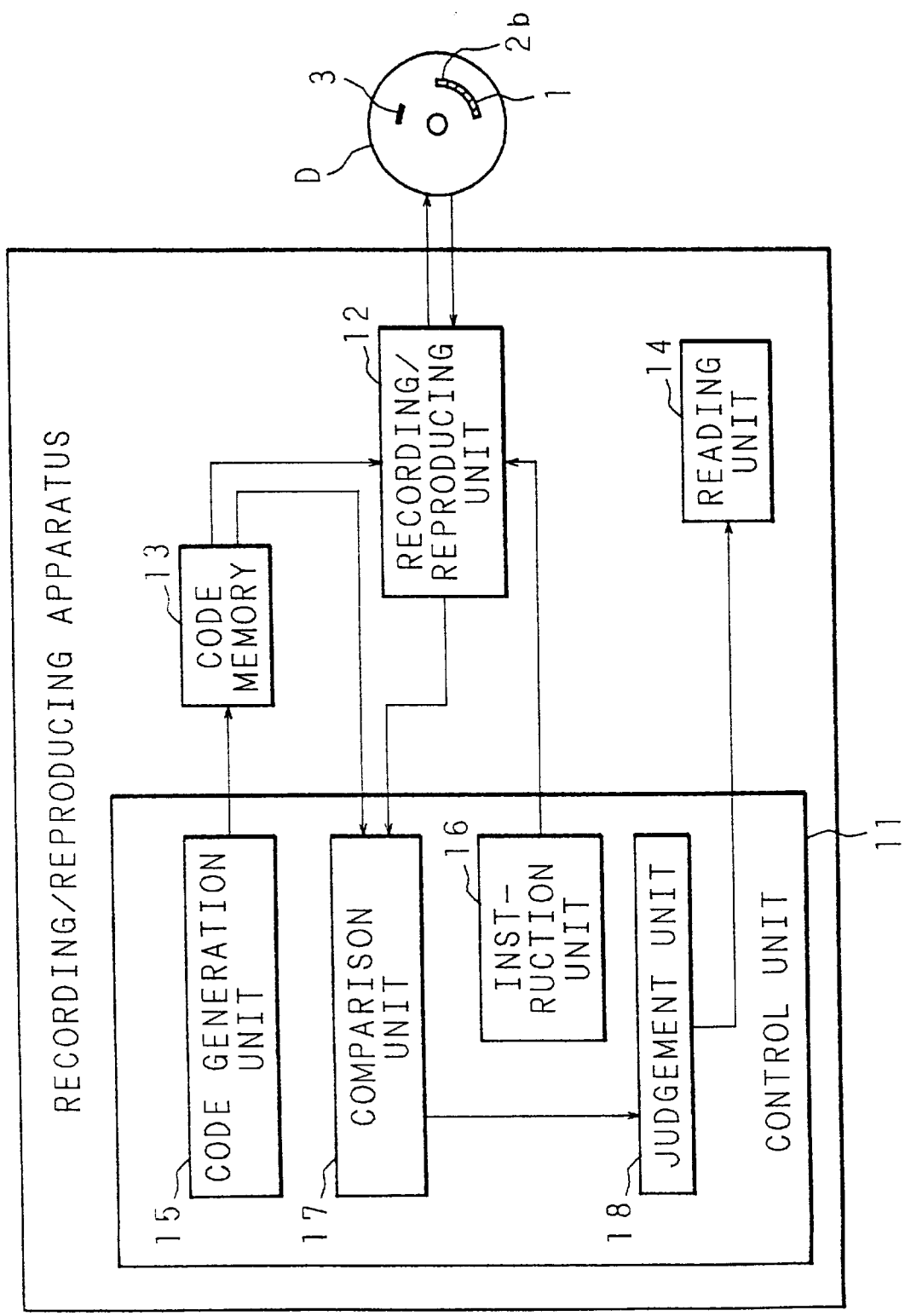
FIG. 1 is a block diagram for showing the structure of a recording/reproducing apparatus according to a first embodiment of the invention.

FIG. 1 is a block diagram for showing a recording/reproducing apparatus according to a first embodiment. In FIG. 1, D indicates a magneto-optical disk, that is, an information recording medium of this invention. In the magneto-optical disk D, identification data 1 of plural bits peculiar to each medium, first error correction code data 2b and key recording area data 3 are recorded. The recording/reproducing apparatus includes a control unit 11 for controlling a recording/reproducing operation on the loaded magneto-optical disk D, a recording/reproducing unit 12 for conducting a recording/reproducing operation in a predetermined area of the magneto-optical disk D, a code memory 13 for storing an overwrite code to be recorded in a predetermined area of the magneto-optical disk D, and a reading unit 14 for reading the identification data 1, with an arrangement of irreversible areas and reversible areas stored. An irreversible area herein means a (nonvolatile recording) area where information is irreversibly recorded, and a reversible area means an area where no data is recorded or data is rewritably recorded.

The control unit 11 includes a code generation unit 15 for generating the overwrite code to be supplied to the code memory 13, a specification unit 16 for instructing the area for recording the overwrite code, a comparison unit 17 for receiving and comparing the overwrite code and a reproduced code obtained by reproducing the area of the magneto-optical disk D where the overwrite code has been recorded, and a judgement unit 18 for receiving the result of the comparison and judging whether the reproduced area is an irreversible area or a reversible area, so as to output the result of the judgement to the reading unit 14.

Figure 2:
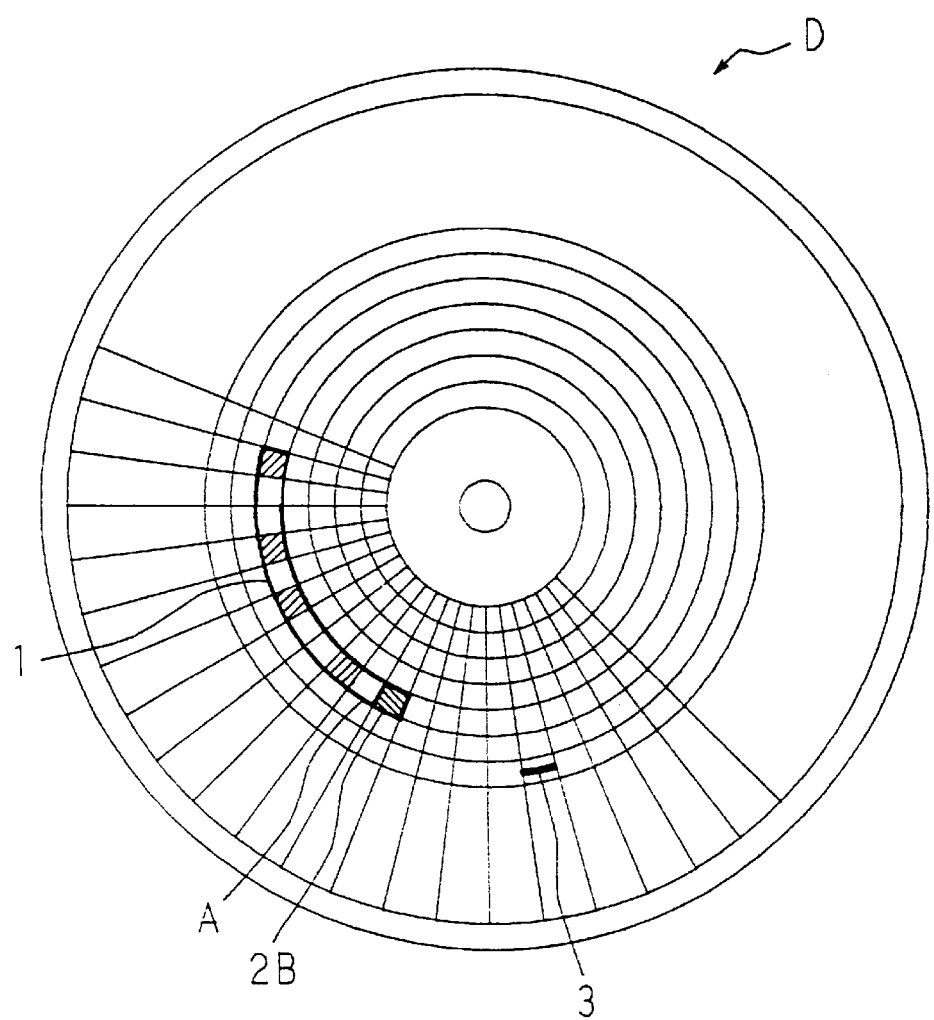
FIG. 2 is a schematic plan view for showing the structure of a magneto-optical disk of the invention.

FIG. 2 is a schematic plan view of the magneto-optical disk D of the invention, which accords with the ISO/IEC 13963 Standard. The magneto-optical disk D is made from a carbonate resin with a thickness of 1.2 mm and an outer diameter of 86 mm, and includes a substrate where a pregroove with a track pitch of 1.4 $\mu$m and a header signal are formed, and a dielectric layer of Y—$SiO_2$, a magnetic layer of DyFeCo, another dielectric layer of Y—$SiO_2$ and a reflection layer of Al successively stacked on the substrate in this order.

Figure 3:
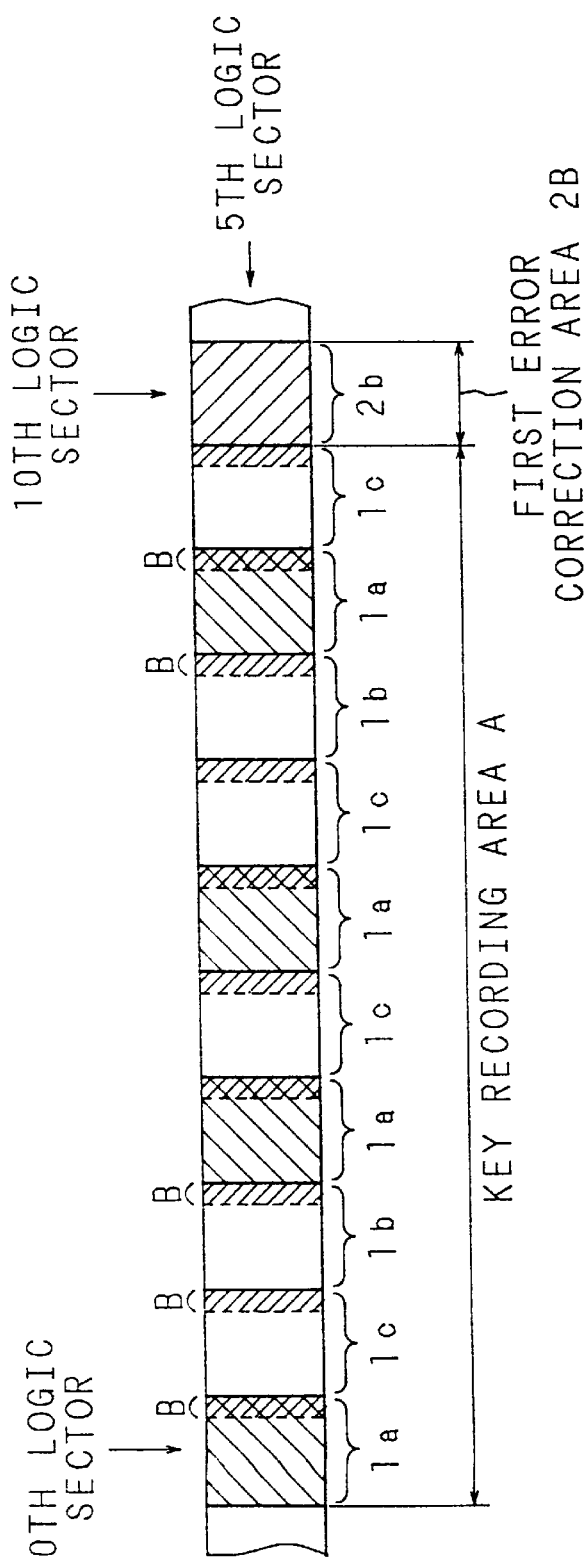
FIG. 3 is an enlarged view of a key recording area shown in FIG. 2.

FIG. 3 is an enlarged view of a key recording area A shown in FIG. 2. As is shown in FIGS. 2 and 3, the magneto-optical disk D includes the key recording area A composed of plural sectors, where the identification data 1, that is, irreversible information, is recorded. A first error correction code 2b (FIG. 2) is recorded in a trailing portion of key recording area A. Error correction code data is data used for correcting an error in reproduced data, and the first error correction code data 2b is used for correcting an error possibly included in the read indentification data 1. Since the error correction code data is thus encoded, the identification data 1 can be prevented from being illegally read through the reproduction of the error correction code data 2b. In this case, any of cryptology such as DES, PC4 and RSA can be adopted. Futhermore, in another area, the key recording area data 3, which is address data of the key recording area A, is recorded.

The key recording area A is formed in 0th through 9th logic sectors of a 5th logic track, and includes continuous 10 sectors. The 0th, 3rd, 5th and 8th logic sectors are unrewritable sectors (hereinafter referred to as the irreversible sectors) 1a where test patterns according to the ISO/IEC 13963 Standard are irreversibly recorded. The 2nd and 7th logic sectors are rewritable sectors (hereinafter referred to as the reversible sectors) 1b where no data is recorded. The 1st, 4th, 6th and 9th logic sectors, which are positioned on the back side in the peripheral direction of the respective irreversible sectors 1a, are buffer sectors 1c which do not concern the identification data 1. The identification data 1 is formed as a combination '1' corresponding to an irreversible sector 1a and '0' corresponding to a reversible sector 1b. In the exemplified case shown in FIG. 3, '101101' is recorded as the identification data 1.

Now, procedures for recording the identification data 1 in the magneto-optical disk D having the aforementioned structure will be described. Under application of a magnetic field in an erasing direction, the magneto-optical disk D is irradiated with a laser with a linear speed of 3 m/s and an erasing power of 25 mW, so as to irreversibly record the test patterns according to the ISO/IEC 13963 Standard in the 0th, 3rd, 5th and 8th logic sectors. The test patterns are recorded in the entire areas of the respective sectors. Thus, the irreversible sectors 1a can be neither rewritten nor erased. Since the linear speed is lower than that of a general recording operation and the power of the laser is higher than that in the general recording operation, the sectors following the 0th, 3rd, 5th and 8th logic sectors, namely, the 1st, 4th, 6th and 9th logic sectors are affected by this recording operation. Therefore, the 1st, 4th, 6th and 9th logic sectors are used as the buffer sectors 1c not concerning the identification data 1.

The method of irreversible recording and reproducing is described in detail in Japanese Patent Application Laid-Open No. 9-73680 (1997) and Japanese Patent Application No. 8-278466 (1996), and the description is herein omitted.

Figure 4:
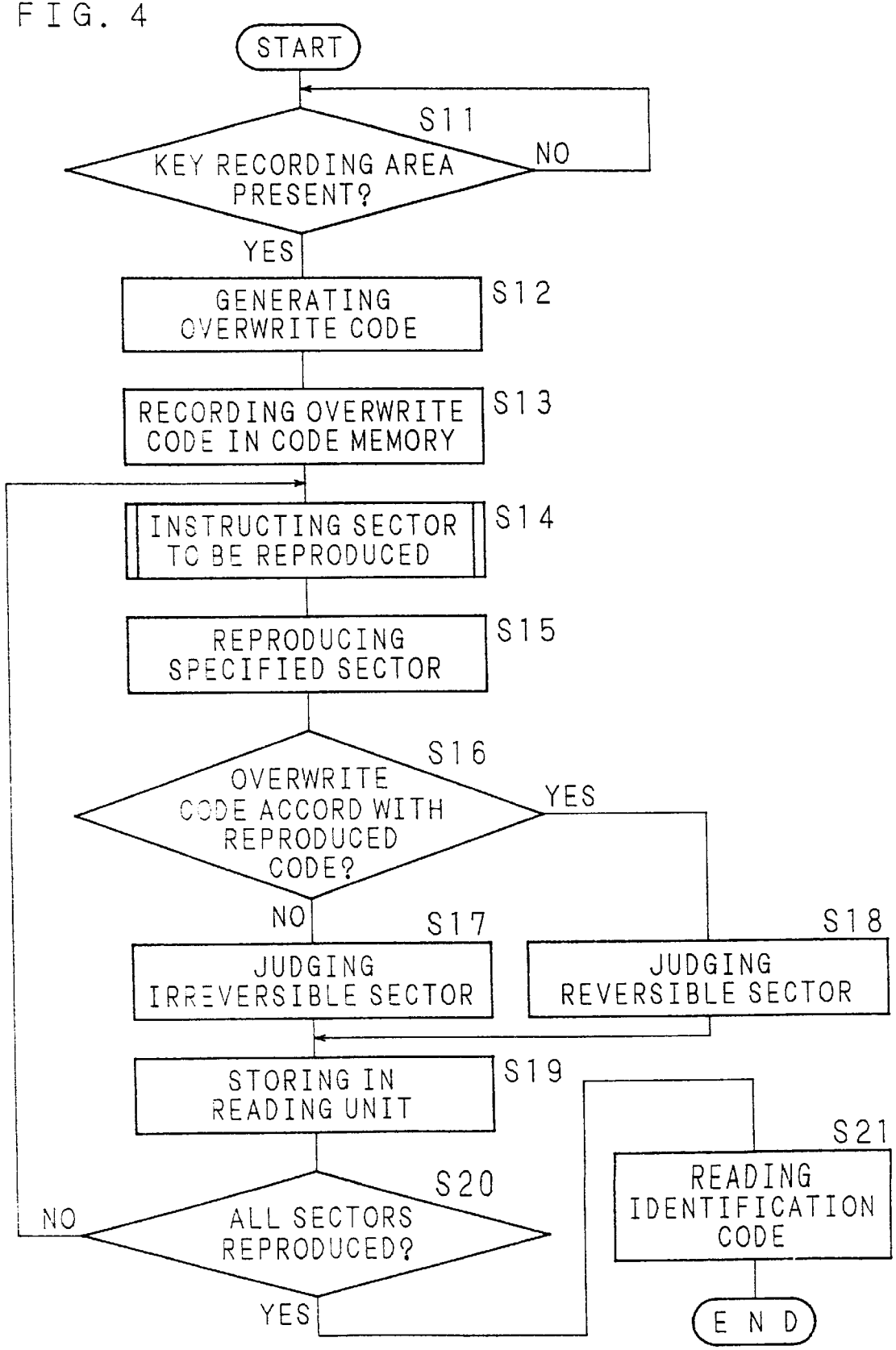
FIG. 4 is a flowchart for showing procedures for reproducing identification data in the first embodiment.

Now, procedures for reproducing the identification data from the magneto-optical disk D, which is recorded in the aforementioned manner, will be described. FIG. 4 is a flowchart for showing the procedures for reproducing the identification data adopted in this embodiment. First, the key recording area data 3 of the magneto-optical disk D is reproduced, and when the key recording area A is present, the address thereof is obtained (step S11). Then, the code generation unit 15 generates the overwrite code (step S12). The overwrite code is generated so as to include at least both of binary values, and includes '0' and '1' in equal number, similarly to, for example, an 8 bit code '0, 1, 0, 1, 0, 1, 0, 1'. Thus, accidental coincidence in comparison by the comparison unit 17 can be avoided. Such an overwrite code is stored in the code memory 13 as well as supplied to the comparison unit 17, so as to be repeatedly recorded in the key recording area A (step S13). At this point, the overwrite code is recorded by a magnetic field modulation recording method without a verifying process.

Figure 5:
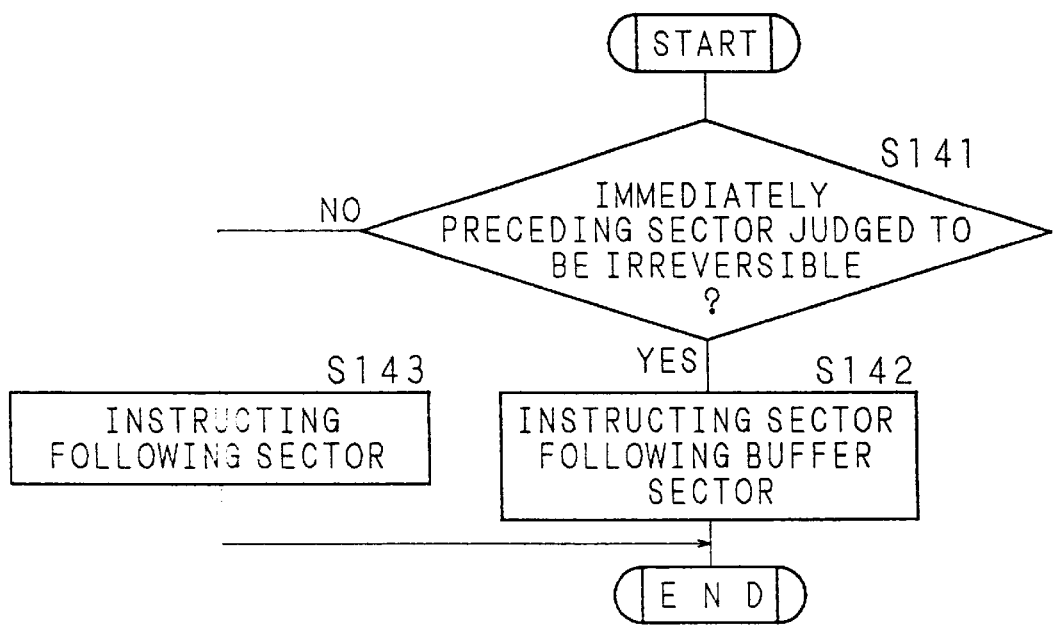
FIG. 5 is a flowchart for showing procedures for instructing a sector to be reproduced by a specification unit shown in FIG. 1.

Next, the specification unit 16 specifies a sector to be reproduced to the recording/reproducing unit 12 (step S14). FIG. 5 is a flowchart for showing procedures for the specification unit 16 to instruct the sector to be reproduced. As is shown in FIG. 5, the specification unit 16 verifies whether or not an immediately preceding sector is judge to be an irreversible sector (Step S141). When not, the following sector is specified (step S143). When the preceding sector is judged to be an irreversible sector, the following sector is assumed to be the buffer sector 1c and a sector following the buffer sector 1c is specified (step S142). As is shown in FIG. 4, the sector specified in this manner is reproduced by the recording/reproducing unit 12 (step S15). A reproduced code obtained in this manner is input to the comparison unit 17, and the comparison unit 17 compares the reproduced code with the overwrite code (step S16).

As a result of the comparison, when the codes accord with each other, the judgement unit 18 determines that the reproduced sector is a reversible sector (step S18), and when the codes do not accord with each other, the reproduced sector is judged to be an irreversible sector (step S17). This judgement is obtained on the basis of the following: Since the overwrite code can be normally recorded in and reproduced from a reversible sector, the overwrite code accords with the reproduced code read from a reversible sector. On the other hand, the overwrite code cannot be normally recorded in an irreversible sector, and hence, the overwrite code does not accord with the reproduced code read from an irreversible sector. Then, the reading unit 14 stores that the reproduced sector is an irreversible sector or a reversible sector (step S19). It is then checked whether or not all sectors to be reproduced in the key recording area A have been reproduced (step S20). When not, the procedure returns to step S14, so that the specification unit 16 can instruct a next sector to be reproduced and the specified sector can be judged to be an irreversible sector or a reversible sector in the same manner. When it is determined that all the sectors have been reproduced in step S20, the reading unit 14 decodes the identification data by using a predetermined system, so as to read the identification code (step S21). Then, the first error correction code data 2b is reproduced from the first error correction area 2B, so as to execute error correction on the identification data 1. The recording area for the first error correction code data 2b is not limited to the backward portion in the peripheral direction of the key recording area A.

When the identification data 1 as is shown in FIG. 3 is reproduced, the 0th, 3rd, 5th and 8th logic sectors are judged to be the irreversible sectors 1a and the 2nd and 7th sectors are judged to be the reversible sectors 1b. As a result, the identification data 1 of '101101' is read by the reading unit 14.

By using the aforementioned recording/reproducing apparatus, the irreversibly recorded identification data 1 can be read. Furthermore, since the buffer sectors 1c are provided in the backward areas in the peripheral direction of the irreversible sectors 1a, the identification data 1 can be accurately read. Moreover, since the overwrite code is generated to include at least one '0' and one '1', a mistake in the judgement between an irreversible sector and a reversible sector can be avoided.

In addition, when the identification data 1 recorded in an illegally copied magneto-optical disk is to be reproduced, all the sectors in the key recording area are rewritten with the overwrite code in recording the overwrite code in step S13. Therefore, all the sectors are judged to be the reversible sectors 1b. In this manner, the magneto-optical disk is revealed to be an illegally copied product. Also, an illegally copied product can be discriminated by reproducing the first error correction code data 2b and conducting the error correction on the identification code 1.

Embodiment 2

In the first embodiment, it is determined whether or not a reproduced sector is an irreversible sector by comparing the overwrite code and the reproduced code. It also can be determined by judging whether or not a sector is normally reproduced.

Figure 6:
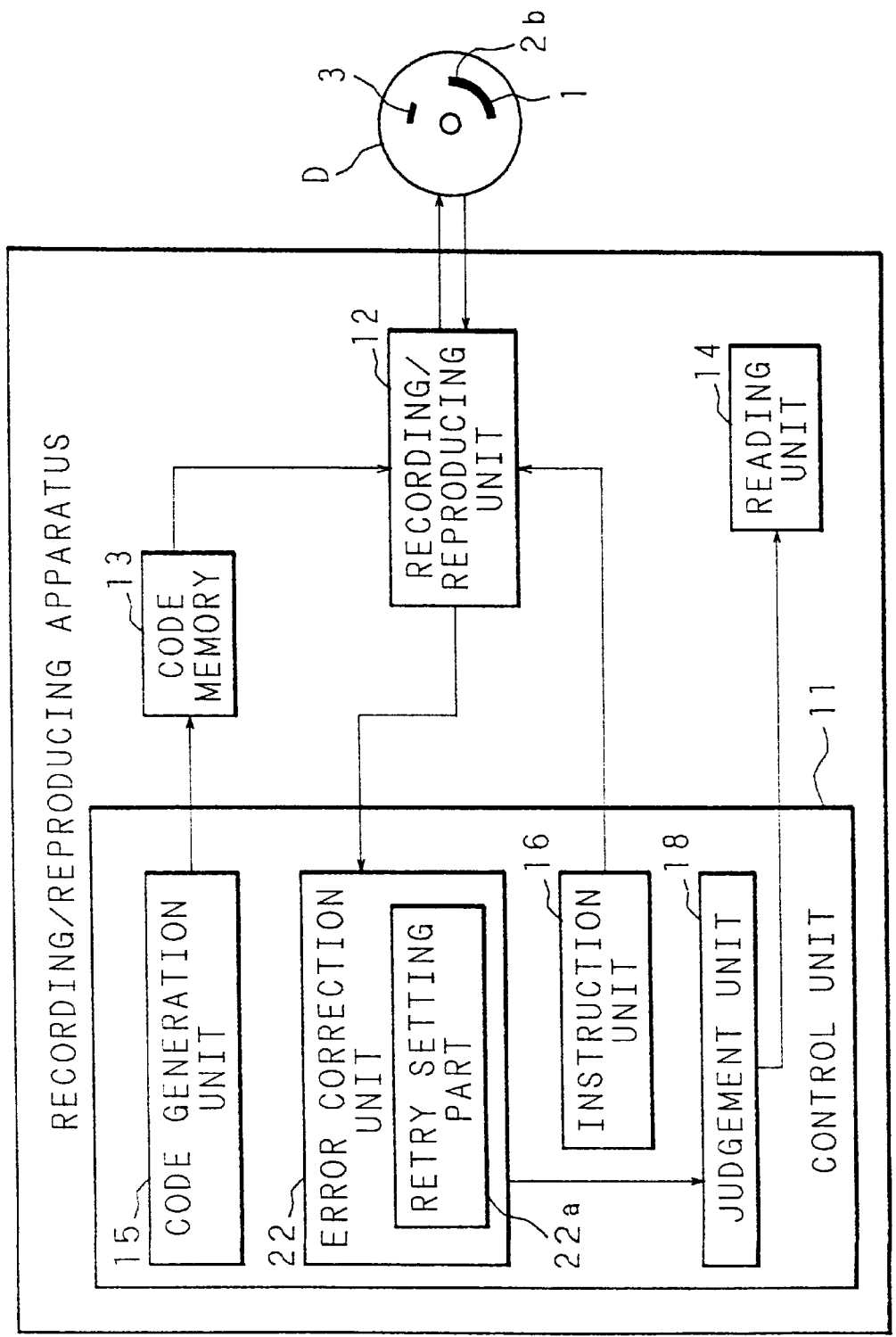
FIG. 6 is a block diagram for showing the structure of a recording/reproducing apparatus according to a second embodiment of the invention.

FIG. 6 is a block diagram for showing the structure of a recording/reproducing apparatus according to a second embodiment. The recording/reproducing apparatus includes a control unit 21 for controlling a recording/reproducing operation on a loaded magneto-optical disk D, a recording/reproducing unit 12 for conducting a recording/reproducing operation in a predetermined area of the magneto-optical disk D, a code memory 13 for storing an overwrite code to be recorded in a predetermined area of the magneto-optical disk D, and a reading unit 14 for reading identification data 1, with an arrangement of irreversible areas and reversible areas stored.

The control unit 21 includes a code generation unit 15 for generating the overwrite code to be supplied to the code memory 13, a specification unit 16 for instructing an area for recording the overwrite code, an error correction unit 22 for determining, on the basis of a reproduced code read from the magneto-optical disk D and error correction code data, whether or not the reproduced code has an error and an error of the reproducing code can be corrected, and a judgement unit 18 for receiving a result of the error correction so as to judge whether the reproduced area is an irreversible area or a reversible area, and supplying a result of the judgement to the reading unit 14. The error correction unit 22 includes a retry setting part 22a for setting a retry frequency for repeating the error correction when the error correction is not normally completed.

In the magneto-optical disk D, the identification data 1, first error correction code data 2b and key recording area data 3 are recorded as is shown in FIG. 3. Also, in a second half of each sector in a key recording area A, a second error correction area B is formed so as to record second error correction code data 2a. Except for this, the magneto-optical disk D has the same structure as that of the first embodiment, and the description is omitted.

Figure 7:
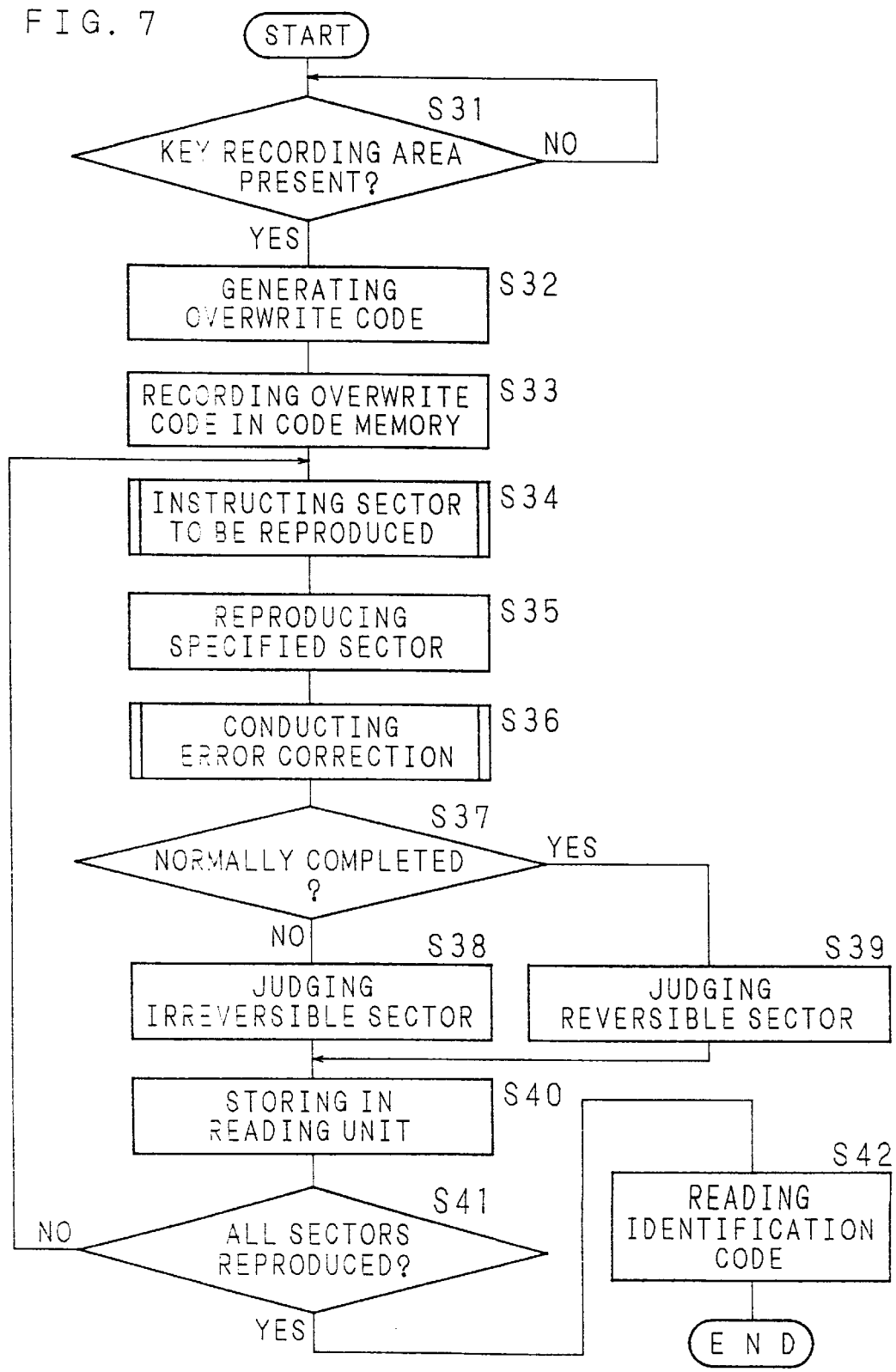
FIG. 7 is a flowchart for showing procedures for reproducing identification data in the second embodiment.

Now, procedures for reproducing the identification data of the magneto-optical disk D having the aforementioned structure will be described. FIG. 7 is a flowchart for showing the procedures for reproducing the identification data adopted in the second embodiment. First, the key recording area data 3 of the magneto-optical disk D is reproduced, and when the key recording area A is present, its address is obtained (step S31). Then, the code generation unit 15 generates an overwrite code (step S32). The overwrite code is generated so as to include at least both of binary values. Thus, accidental coincidence in the comparison can be avoided. The overwrite code is stored in the code memory 13 as well as repeatedly recorded in the key recording area A (step S33). At this point, the second error correction code data 2a is recorded in the second error correction area B formed in the second half of each sector. The second error correction code data 2a is data used for correcting an error in the overwrite code. The overwrite code is recorded by the magnetic field modulation recording method without a verifying process.

Next, the specification unit 16 specifies a sector to be reproduced to the recording/reproducing unit 12 (step S34). The procedures for the specification unit 16 to instruct a sector to be reproduced are the same as those described in the first embodiment and shown in FIG. 5, and the description of the procedures is omitted. The recording/reproducing unit 12 reproduces the sector specified by the specification unit 16 (step S35). A reproduced code obtained by reproducing the overwrite code and the second error correction code data 2a are input to the error correction unit 22, which conducts the error correction (step S36), so as to judge whether or not the sector has been normally completed to be reproduced (step S37).

Figure 8:
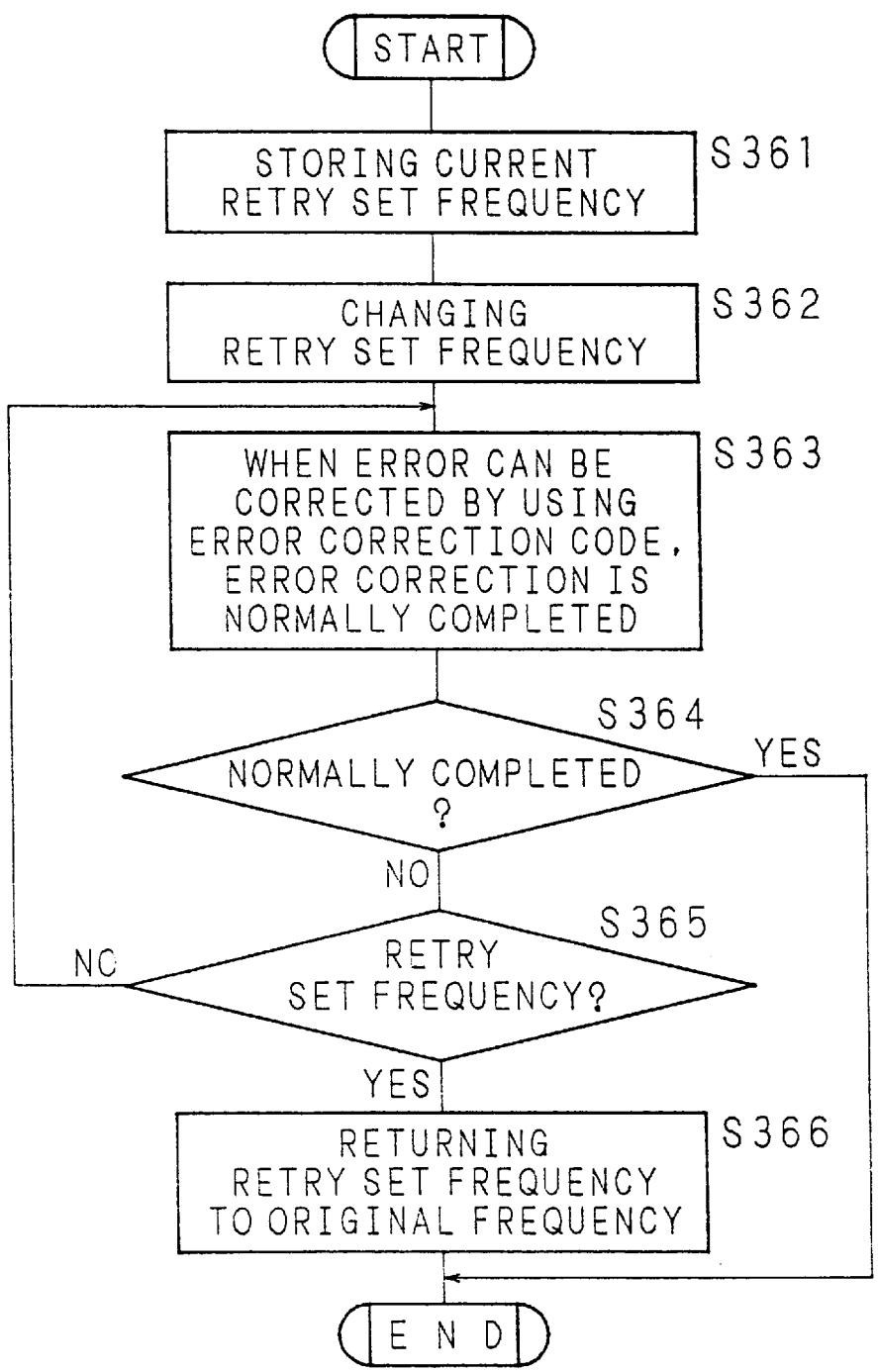
FIG. 8 is a flowchart for showing procedures for changing a set frequency by an error correction unit shown in FIG. 6.

FIG. 8 is a flowchart for showing procedures of the error correction conducted by the error correction unit 22. As is shown in FIG. 8, the retry setting part 22a of the error correction unit 22 stores a current retry set frequency (step S361), and changes the retry set frequency to a possible minimum frequency, for example, 0 times, once or twice, which is smaller than a normal frequency (i.e., 4 through 8 times) (step S362). On the basis of the supplied reproduced code and the second error correction code data 2a, it is checked whether or not the reproduced code has an error. When the reproduced code has no error, or when the error can be corrected by using the error correction code data 2a, the error correction is normally completed (step S363).

It is determined whether or not the error correction of the reproduced sector has been normally completed (step S364), and when it is determined to have been normally completed, it is determined that the reproduction of the sector has been normally completed in step S37 (of FIG. 7). When it is determined that the error correction has not been normally completed, it is determined whether or not the current retry frequency is equal to the retry set frequency (step S365). When the current retry frequency is smaller than the retry set frequency, the reproduced code and the second error correction code data 2a are fetched again, so as to conduct the error correction again from the procedure of step S363. When the current retry frequency is judged to be equal to the retry set frequency in step S365, it is determined that the reproduction of the sector has not been normally completed in step S37 (of FIG. 7), and the set frequency is returned to the frequency stored in step S361 (step S366). In this manner, the retry set frequency for the error correction can be varied between the case where the key recording area A is to be reproduced and the case where an area other than the key recording area A is to be reproduced. Therefore, the error correction can be conducted with a smaller retry frequency than the normal frequency in reading the identification data 1.

When the sector has been normally reproduced, the judgement unit 18 judges the sector to be a reversible sector (step S39), and when the sector has not been normally reproduced, the judgement unit 18 judges the sector to be an irreversible sector (step S38). This judgement is obtained on the basis of the following: The overwrite code is normally recorded in and reproduced from a reversible sector, and hence, the error correction of a reversible sector can be normally completed. On the other hand, since the overwrite code cannot be normally recorded in an irreversible sector, the error correction of an irreversible sector cannot be normally completed. Then, the recording unit 14 stores that the specified sector is an irreversible sector or a reversible sector (step S40).

It is checked whether or not all sectors to be reproduced in the key recording area A have been reproduced (step S41). When not, the procedure returns to step S34, so that the specification unit 16 can instruct a subsequent sector to be reproduced and the subsequent sector can be judged to be an irreversible sector or a reversible sector in the same manner. When it is determined that all the sectors to be reproduced in the key recording area A have been reproduced in step S41, the identification data is decoded by using a predetermined system by the reading unit 14, so as to read the identification data 1 (step S42). Then, the first error correction code data 2b is reproduced from the first error correction area 2B, and the error correction is conducted on the identification data 1.

In this manner, the irreversibly recorded identification data 1 can be read by using the aforementioned recording/reproducing apparatus. Furthermore, since the buffer sector 1c is provided on the back side in the peripheral direction of each irreversible sector 1a, the identification data 1 can be accurately read. Moreover, since the overwrite code is generated so as to include at least one '0' and one '1', the mistake in the judgement between an irreversible sector and a reversible sector can be avoided. Furthermore, since the retry set frequency for the error correction can be changed to be smaller than the normal frequency in reading the identification data 1, the identification data 1 can be rapidly read.

When the identification data 1 recorded in an illegally copied magneto-optical disk is to be reproduced, all the sectors in the key recording area are rewritten with the overwrite code in recording the overwrite code in step S33. Therefore, all the sectors are normally reproduced and judged to be the reversible sectors 1b. Thus, the magneto-optical disk is revealed to be an illegally copied product. Also, an illegally copied product can be discriminated by conducting the error correction on the identification data 1 by using the reproduced first error correction code data 2b.

In each of the first and second embodiments, it is determined whether or not the loaded magneto-optical disk D has an irreversible area by reading the recording area data 3 recorded in the magneto-optical disk D, which does not limit the invention. It is also possible to determine whether or not a predetermined area is an irreversible area by reading the predetermined area together with the error correction code data so as to confirm whether or not the reading operation can be normally completed.

Also, in the aforementioned embodiment, the code generation unit 15 is independent from the comparison unit 17 for receiving the reproduced code, which does not limit the invention. The code generation unit 15 and the comparison unit 17 can include a common mechanism. However, when they are independent from each other, the operation speed can be improved.

Furthermore, in the aforementioned embodiments, the overwrite code to be overwritten in the key recording area A is generated by the code generation unit 15 every time of the overwriting. However, a previously generated overwrite code can be stored in a nonvolatile memory such as the code memory 13, so as to be used in every overwriting.

Moreover, in the aforementioned embodiments, the overwrite code is magneto-optically recorded by the magnetic filed modulation recording method, which does not limit the invention, and an optical modulation recording method can be adopted. However, in adopting the optical modulation recording method, it is necessary to conduct an erasing operation in the key recording area A before recording the overwrite code.

Futhermore, in the aforementioned embodiments, the buffer sector 1c merely follows each irreversible sector 1a, but the buffer sector 1c can follow every sector. Specifically, in FIG. 3, the buffer sector 1c also can follow each reversible sector 1b, so that twelve sectors can constitute the key recording area A. Thus, the number of sectors in the key recording area A is increased. However, since the positions of the buffer sectors 1c can be defined, the number of sectors in the key recording area A cannot be varied depending upon the combination of '0' and '1' used as the irreversible identification data. In addition, there is no need to conduct the procedure of step S141 of FIG. 5, namely, the judgement of a preceding sector to be an irreversible sector, in reading the identification data. Accordingly, the reading operation for the identification data can be rapidly conducted.

Furthermore, in the aforementioned embodiments, each of an irreversible area, a reversible area and a buffer area is constituted of one sector, which does not limit the invention. Such an area can be smaller than one sector, for example, can be a half sector, or plural sectors can be used as a unit area.

As described above, according to the present recording/reproducing apparatus and reproducing method, irreversibly recorded data peculiar to a medium such as identification data can be read from the information recording medium. Also, a mistake in the judgement of a unit area between an irreversible area and a reversible area can be avoided, and the irreversible data can be accurately read.

Also, according to the present information recording medium, a buffer area which does not concern the irreversible data is provided between an irreversibly recorded unit area and a following unit area, so that the following unit area can be prevented from being affected, and hence, the irreversible data can be accurately read. In addition, since an error correction code for the irreversible data is also recorded, the irreversible data can be accurately read.

As this invention may be embodied in several forms without departing from the spirit of essential characteristics thereof. the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information recording medium having a medium identification code for uniquely identifying a medium, comprising:

a key recording area including a continuous arrangement of a plurality of rewritable and nonrewritable recording areas;

said continuous arrangement of rewritable and nonrewritable recording areas including at least one buffer recording area formed immediately adjacent a trailing end of each of said nonrewritable recording areas.

2. The information recording medium according to claim 1, wherein the medium identification code being defined by the sequential arrangement of rewritable and nonrewritable areas within said key recording area in which said rewritable areas are assigned a first binary value and said nonrewritable areas are assigned a complementary value to said first binary value, while ignoring said buffer recording areas.

3. The information recording medium according to claim 1, further comprising:

a reproduced code error correction area, in a trailing portion of said key recording area, for checking an error about a reproduced code in said key recording area.

* * * * *